United States Patent
Liu et al.

(10) Patent No.: US 9,149,724 B2
(45) Date of Patent: Oct. 6, 2015

(54) NETWORK GAME SYSTEM WITHOUT DYNAMIC OBSTRUCTIONS AND PROCESSING METHOD THEREOF

(71) Applicant: TENCENT TECHNOLOGY (SHENZHEN) COMPANY LIMITED, Shenzhen (CN)

(72) Inventors: Lin Liu, Shenzhen (CN); Xiaocheng Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 14/076,625

(22) Filed: Nov. 11, 2013

(65) Prior Publication Data
US 2014/0073435 A1 Mar. 13, 2014

Related U.S. Application Data

(63) Continuation of application No. PCT/CN2013/081663, filed on Aug. 16, 2013.

(30) Foreign Application Priority Data

Aug. 17, 2012 (CN) .......................... 2012 1 0293556

(51) Int. Cl.
*A63F 13/00* (2014.01)
*A63F 13/56* (2014.01)
(Continued)

(52) U.S. Cl.
CPC .................. *A63F 13/56* (2014.09); *A63F 13/30* (2014.09); *A63F 13/358* (2014.09); *A63F 13/45* (2014.09); *A63F 13/822* (2014.09); *G06T 17/00* (2013.01); *A63F 13/12* (2013.01); *A63F 13/335* (2014.09)

(58) Field of Classification Search
CPC ....... A63F 13/12; A63F 13/56; A63F 13/822; A63F 13/10; A63F 2300/807; A63F 2300/64; A63F 2300/65; A63F 2300/646; G06T 17/00
See application file for complete search history.

(56) References Cited

U.S. PATENT DOCUMENTS 6,666,764 B1 * 12/2003 Kudo ................................ 463/8
6,736,724 B1 * 5/2004 Erikawa et al. .................... 463/7
(Continued)

FOREIGN PATENT DOCUMENTS

| CN | 1987881 A | 6/2007 |
|---|---|---|
| CN | 1990074 A | 7/2007 |

(Continued)

OTHER PUBLICATIONS

The World Intellectual Property Organization (WIPO) International Search Report for PCT/CN2013/081663 Oct. 31, 2013.
(Continued)

*Primary Examiner* — Justin Myhr
(74) *Attorney, Agent, or Firm* — Anova Law Group, PLLC

(57) ABSTRACT

Processing methods are provided for network game systems without dynamic obstructions. In an exemplary method, when a non-player-controlled character (NPC) role selects a user role as a target of a short-range interaction on a game map, a rotation angle C=N×a can be determined, N being a total number of all NPC roles having the short-range interaction with the user role before the selecting, and "a" being a reference angle. Next, a destination point of the NPC role can be calculated by rotating the NPC role by C from a current point and around the user role. When there is a static obstruction at the destination point, the destination point can be re-calculated by adding a specified angle to the current C. When there is no static obstruction, the NPC role can be moved to the destination point.

14 Claims, 8 Drawing Sheets

(51) Int. Cl.
  *A63F 13/358* (2014.01)
  *A63F 13/45* (2014.01)
  *A63F 13/822* (2014.01)
  *G06T 17/00* (2006.01)
  *A63F 13/30* (2014.01)
  *A63F 13/335* (2014.01)

(56) References Cited

U.S. PATENT DOCUMENTS

2004/0116186 A1  6/2004  Shim et al.
2006/0258448 A1* 11/2006  Ishibashi et al. ............... 463/31
2007/0218992 A1*  9/2007  Maehiro et al. ............... 463/31

FOREIGN PATENT DOCUMENTS

| CN | 101071515 A | 11/2007 |
| CN | 102136025 A | 7/2011 |
| JP | 2004187806 A | 7/2004 |
| JP | 2006174930 A | 7/2006 |
| JP | 2007098162 A | 4/2007 |
| JP | 2007229204 A | 9/2007 |
| JP | 2009233207 A | 10/2009 |
| JP | 2011024876 A | 2/2011 |
| JP | 2012061091 A | 3/2012 |
| WO | 2005/063157 A1 | 7/2005 |

OTHER PUBLICATIONS

Massively multiplayer online real-time strategy game From Wikipedia, the free encyclopedia.
Kingdom Wars Steam, Apr. 1, 2013.

* cited by examiner

NETWORK GAME SYSTEM WITHOUT DYNAMIC OBSTRUCTIONS AND PROCESSING METHOD THEREOF

CROSS-REFERENCES TO RELATED APPLICATIONS

This application is a continuation of PCT Patent Application No. PCT/CN2013/081663, filed on Aug. 16, 2013, which claims priority to Chinese Patent Application No. 201210293556.5, filed on Aug. 17, 2012, the entire contents of all of which are incorporated herein by reference.

FIELD OF THE INVENTION

The present disclosure generally relates to computer data processing technology and, more particularly, relates to network game systems without dynamic obstructions and processing methods thereof.

BACKGROUND

Network game, also called "online game", is a sustainable multiplayer online game that uses the Internet as transmission medium, game servers and user devices (such as computers, smartphones, tablet computers) as processing terminals, and game client terminals or webpages as information exchange windows. Network game is generally intended to realize various purposes such as entertainment, recreation, communication and accomplishing virtual achievements, etc.

Existing network game systems include two main types of interaction modes between roles, i.e., an interactive competition mode among users, and an interactive competition mode between a user and environment.

The interactive competition mode among users (PVP, or Player VS Player) means competition between users. A network game system may need to include a processing system related to PVP, in order to process interaction instructions and data under the PVP mode.

The interactive competition mode between user and environment (PVE, or Player VS Environment) means interactive competition formed between a user and a non-player-controlled character (NPC). The NPC is controlled by an NPC system in the network game system. The NPC system includes artificial intelligence (AI) module(s). The AI module(s) refer to the control logic of the NPC in games, and can make the NPC in games possess independent artificial intelligence capabilities. User roles and NPC roles can have gaming interactions, such as dialogue, obtaining services, combating, etc.

Existing network game systems, especially Kingdom Wars type of network game systems, i.e., massive multiplayer online real-time strategy (MMORTS) game systems, may be based on PVP mode. However, rich PVE mode also needs to be provided in network games in order to meet the demand of role growth. Good user experience is also required in the running and processing of the PVE mode.

Based on methods for obstructing between roles, existing network game systems can be divided into network game systems with dynamic obstructions and network game systems without dynamic obstructions.

In the network game systems with dynamic obstructions, a role model can be obstructed not only by fixed landscapes (e.g., mountains, stones, houses, etc.), but also by other role models. The role model is a simulated 2D (2-dimensional) or 3D (3-dimensional) image of a role. For example, the role model is usually a 2D image in a 2D network game, and is usually a 3D image in a 3D network game.

In the network game systems without dynamic obstructions, a role model can be obstructed by fixed landscapes, but does not have to be obstructed by other dynamic role models.

In MMORTS network games, there can be a large number of roles participating in the game. In order to ensure the clarity of role models' locations in the picture and ensure that good picture operation experience is provided for users, the role models controlled by the network game system need to avoid visually overlapping with each other during short-range interactions. For example, the short-range interactions can be attacking interactions in which an NPC role attacks a user role, or other dialogue interactions, etc.

In a network game system with dynamic obstructions, the game system has a special obstruction algorithm for real-time calculation of dynamic obstruction information between role models. Therefore, the probability of role models visually overlapping with each other is low. Thus, operation experience is good. However, because real-time calculation of dynamic obstruction information is needed, the server system overhead can be too high, wherein the overhead includes central processing unit (CPU) overhead and storage resource overhead.

In a network game system without dynamic obstructions, because dynamic obstruction information does not need to be real-time calculated, the cost of system can be lower in comparison with a network game system with dynamic obstructions. Therefore, existing large-scale MMORTS network games, which are based mainly on PVP modes with PVE modes as supplement, are usually without dynamic obstructions.

In existing network game systems without dynamic obstructions, in order to solve the issue of reducing role models' overlapping during the short-range interactions between user role and NPC role, and to provide users with good visual experience, an AI module of the NPC system needs to detect and calculate in real time relative coordinate positions between roles and to dynamically adjust the coordinates of the NPC role. A method for such real-time detection and calculation can include specific steps as follows.

For example, an NPC role has current coordinates of (x1, y1) and a radius of r1, and a user role has current coordinates of (x2, y2) and a radius of r2. A radius for a short-range interaction to occur between the NPC role and the user role (such as the NPC role attacking the user role) is ar. When the NPC role has an attacking target (i.e., a target role), a distance s between the coordinate points of the NPC role and the user role is calculated at each time when a driving clock cycle of the NPC role arrives.

If s>r1+r2+ar, the NPC role continues to move toward the target role, and sends a "move" message packet to all roles in a field of view.

If s>r1+r2+ar, the NPC role immediately stops moving, and sends a "stop moving" message packet to all roles in the field of view.

Another NPC role that attacks the same user role can dynamically calculate and adjust the position of itself according to the message packets from other NPC roles regarding whether to move or not, so as to avoid overlapping with other NPC role models.

Therefore, in existing network game systems without dynamic obstructions, in order to reduce the probability of role models' overlapping during short-range interactions between user role and NPC role, each NPC role is required to perform real-time and complex dynamic calculation at each time when a driving clock cycle arrives. That is, each NPC role needs to not only calculate the distance s between itself and the attacking target (i.e., the target role), but also determine whether to send a relevant message packet according to the length of s, and also receive message packets from other NPC roles to re-calculate its own coordinate position based on the moving situations of the other NPC roles. Thus, the amount of calculations can be tremendous, and can take a large amount of system overhead, such as CPU overhead, storage overhead, bandwidth overhead, etc. Especially in large network game systems, the number of NPC roles in a server can be usually more than the order of tens of thousands. As a result, the overhead of the NPC system that drives the NPC roles can be very large.

BRIEF SUMMARY OF THE DISCLOSURE

One aspect of the present disclosure includes a processing method for a network game system without dynamic obstructions. The method includes monitoring a short-range interaction state of a non-player-controlled character (NPC) role on a map of a game having a user role corresponding to a user playing the game. When the NPC role selects a user role as a target of a short-range interaction, the method includes determining a total number N of all NPC roles that have the short-range interaction with the user role before the NPC role selects the user role as the target. The method also includes determining a rotation angle C using C=N×a, in which "a" is a specified reference angle. Further, the method includes performing a position allocation operation. The position allocation operation can include calculating a destination coordinate point of the NPC role after a simulated rotation from a current coordinate point of the NPC role in a specified direction by the rotation angle C, using a current coordinate point of the user role as a center of a circle. The position allocation operation further includes determining whether there is a static obstruction at the destination coordinate point on the map. When there is a static obstruction, a new rotation angle C can be calculated by adding a specified angle to the current rotation angle C to repeat the position allocation operation. When there is not a static obstruction, the NPC role can be moved to the destination coordinate point to perform the short-range interaction with the user role.

Another aspect of the present disclosure includes a network game system without dynamic obstructions. The network game system without dynamic obstructions includes a state monitoring module, a simulated rotating angle determination module, and a position allocation module. The state monitoring module is configured to monitor a short-range interaction state of an NPC role on a map of a game scene. The state monitoring module is also configured to trigger the simulated rotating angle determination module and the position allocation module after the NPC role selects a user role as a target of a short-range interaction. The simulated rotating angle determination module is configured to determine a rotation angle C=N×a, where N is a total number of all roles that have the short-range interaction with the user role before the NPC role selects the user role as the target, and the "a" is a specified reference angle. The position allocation module is configured to perform a position allocation operation. The position allocation operation includes calculating a destination coordinate point of the NPC role, after a simulated rotation from a current coordinate point of the NPC role in a specified direction by the rotation angle C, using a current coordinate point of the user role as a center of a circle. Further, the position allocation operation includes determining whether there is a static obstruction at the destination coordinate point on the map. When there is a static obstruction, a new rotation angle C can be calculated by adding a specified angle to the rotation angle C to repeat the position allocation operation. When there is not a static obstruction, the NPC role can be moved to the destination coordinate point to perform the short-range interaction with the user role.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the invention, which are illustrated in the accompanying drawings.

Figure 7:
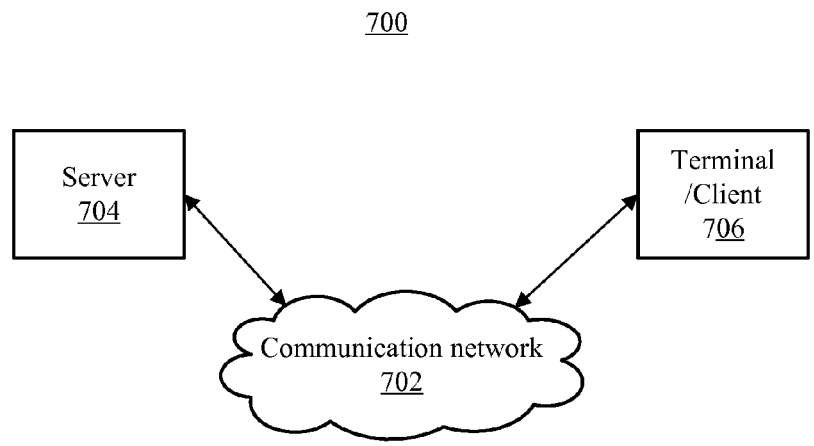
FIG. 7 depicts an exemplary environment incorporating certain disclosed embodiments.

FIG. 7 depicts an exemplary environment 700 incorporating exemplary network game systems without dynamic obstructions and exemplary processing methods thereof in accordance with various disclosed embodiments. As shown in FIG. 7, the environment 700 can include a server 704, a terminal 706, and a communication network 702. The server 704 and the terminal 706 may be coupled through the communication network 702 for information exchange, such as data transmission via a network, information exchange via webpages during network games, etc. Although only one terminal 706 and one server 704 are shown in the environment 700, any number of terminals 706 or servers 704 may be included, and other devices may also be included.

The communication network 702 may include any appropriate type of communication network for providing network connections to the server 704 and terminal 706 or among multiple servers 704 or terminals 706. For example, the communication network 702 may include the Internet or other types of computer networks or telecommunication networks, either wired or wireless.

A terminal, as used herein, may refer to any appropriate user terminal or user device with certain computing capabilities (e g , running a game program), such as a personal computer (PC), a work station computer, a hand-held computing device (tablet), a mobile terminal (a mobile phone or a smart phone), or any other user-side computing device.

A server, as used herein, may refer to one or more server computers configured to provide certain server functionalities, e.g. serving as a network game server in a network game system. A server may also include one or more processors to execute computer programs in parallel.

Figure 8:
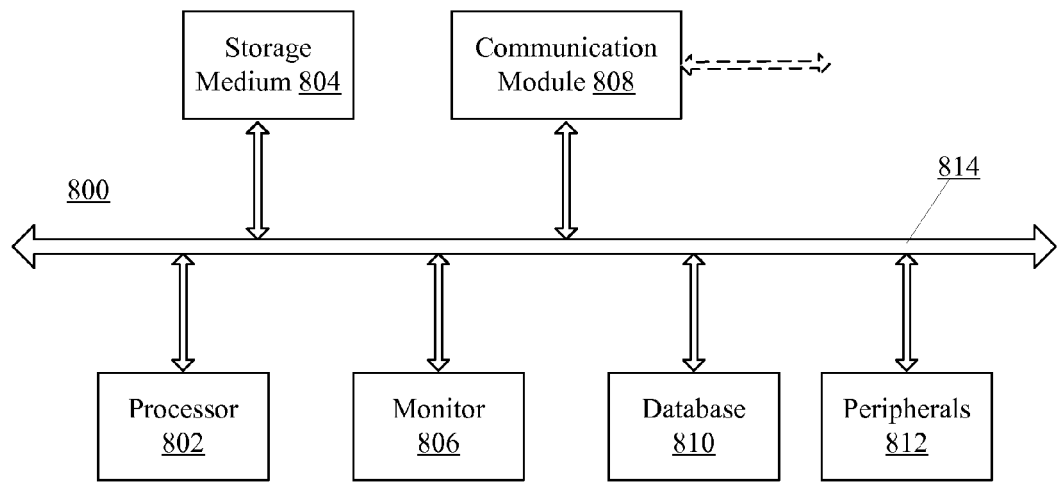
FIG. 8 depicts an exemplary server consistent with the disclosed embodiments.

The server 704 and/or the terminal 706 may be implemented on any appropriate computing platform. FIG. 8 shows a block diagram of an exemplary computing system 800 capable of implementing the server 704 and/or the terminal 706. As shown in FIG. 8, the exemplary computer system 800 may include a processor 802, a storage medium 804, a monitor 806, a communication module 808, a database 810, peripherals 812, and one or more bus 814 to couple the devices together. Certain devices may be omitted and other devices may be included.

The processor 802 can include any appropriate processor or processors. Further, the processor 802 can include multiple cores for multi-thread or parallel processing. The storage medium 804 may include memory modules, such as ROM, RAM, and flash memory modules, and mass storages, such as CD-ROM, U-disk, removable hard disk, etc. The storage medium 804 may store computer programs for implementing various processes, when executed by the processor 802.

The monitor 806 may include display devices for displaying information, such as webpage contents, network game scenes, etc. The communication module 808 may include network devices for establishing connections through the communication network 702. The database 810 may include one or more databases for storing certain data and for performing certain operations on the stored data, such as database searching, etc.

Further, the peripherals 812 may include I/O devices such as keyboard and mouse. The peripherals 812 of the terminal 706 can be used by users to input information during certain operations, such as participating in a network game as a player.

In operation, the terminal 706 may cause the server 704 to perform certain actions, such as data transmission or information exchange via the Internet or other database operations. The server 704 may be configured to provide structures and functions for such actions and operations. More specifically, the server 704 and the terminal 706 may form a network game system to accomplish gaming interactions (e.g., between user roles and NPC roles).

In various embodiments, a terminal such as a user device of the network game system involved in the disclosed methods and systems can include the terminal 706, while a server of the network game system involved in the disclosed methods and systems can include the server 704.

Figure 1A:
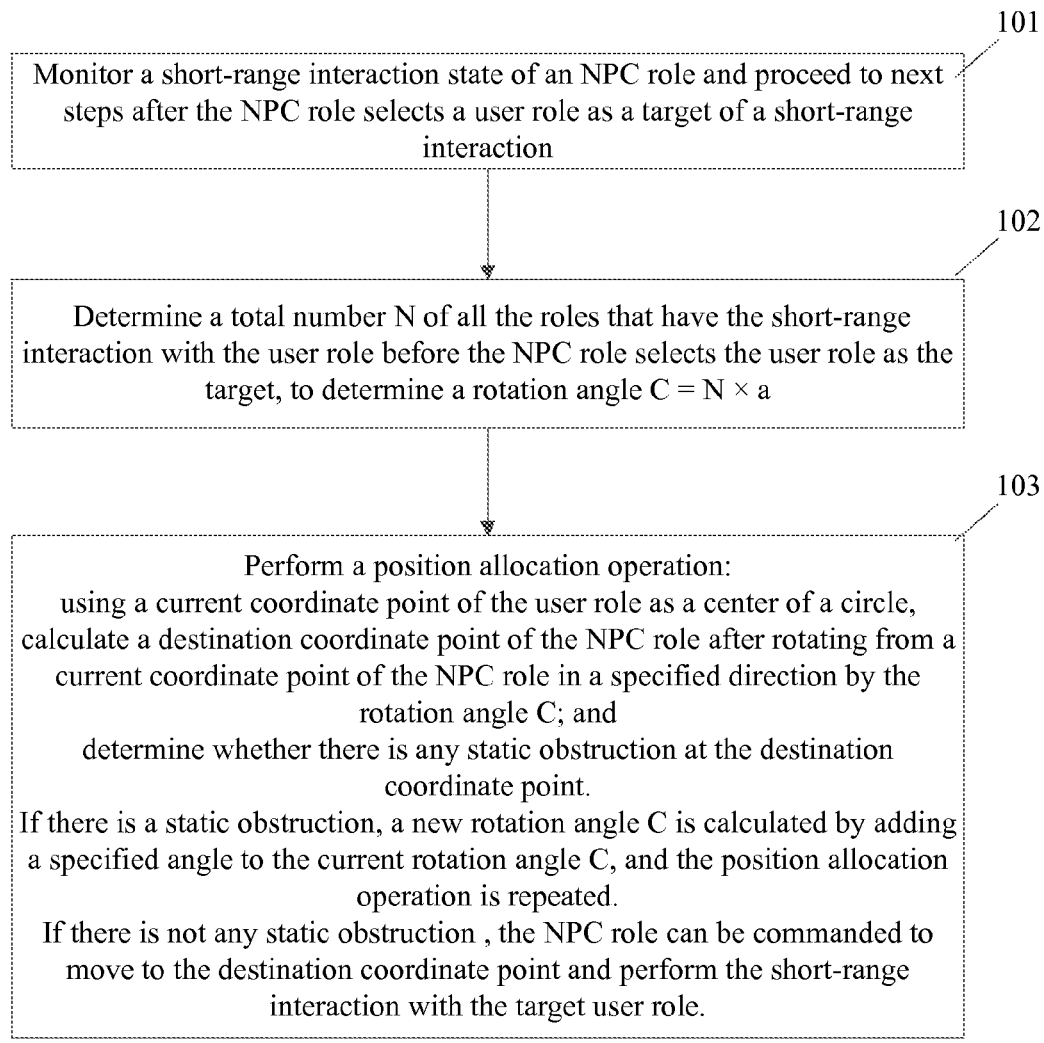
FIG. 1A depicts an exemplary processing method of a network game system without dynamic obstructions in accordance with various disclosed embodiments.

FIG. 1A depicts an exemplary processing method of a network game system without dynamic obstructions in accordance with various disclosed embodiments. The exemplary method can be executed by the network game system, i.e., by the server, the terminal, and/or the server and the terminal. In one embodiment, the exemplary method can be executed by the server of the network game system to interact with user(s) of the terminal.

Referring to FIG. 1A, in Step 101, a short-range interaction state of an NPC role is monitored on a map of a game scene. After the NPC role selects a user role as a target of a short-range interaction, subsequent steps can then be performed. The user role can be a user-controlled role, i.e., a role of a game operator. The short-range interaction can mean a short-range interaction of commands between game roles (such as user roles and/or NPC roles). For example, an NPC role attacking a user role can be a type of short-range interaction. The short-range interaction is not limited to the attacking of roles, but also other short-range interactions, such as dialogues between the roles or other interactions of actions.

In Step 102, a total number N is determined of all the roles that have the short-range interaction with the user role before the NPC role selects the user role as the target of the short-range interaction. A simulated rotation angle $C=N \times a$ can be determined (in radians), wherein the "a" is a specified reference angle (in radians). As used herein, unless otherwise specified, the term "simulated rotation angle C" in this disclosure may be also referred to as "rotation angle C".

In one embodiment, the "all the roles" used to determine the total number N as depicted (e.g., as in Step 102) can include NPC roles. In another embodiment, the "all the roles" used to determine the total number N can include NPC roles and/or other roles in the network game, which can be determined by the scheme of the network game and is not limited by the present disclosure.

In Step 103, a position allocation operation is performed. More specifically, using a current coordinate point of the user role as a center of a circle, a destination coordinate point of the NPC role is calculated after rotating, in a simulated rotation operation, from a current coordinate point of the NPC role in a specified direction by the rotation angle C. After the rotation, it can be determined whether there is any static obstruction at the destination coordinate point on the map. If there is any static obstruction, a new rotation angle C can be calculated by adding a specified angle to the current rotation angle C, and the position allocation operation is repeated. If there is no static obstruction, the NPC role can be commanded to move (i.e., can be moved) to the destination coordinate point and perform the short-range interaction with the target user role (i.e. the user role selected as the target of the short-range interaction). The specified direction can be a counter-clockwise direction, or a clockwise direction.

As used herein, in this disclosure, unless otherwise specified, during the calculation of the destination coordinate point of the NPC role, and before the determination of whether there is any static obstruction at the destination coordinate point on the map, the rotating of the NPC role by the rotation angle C may be a simulated rotation operation.

Figure 2:
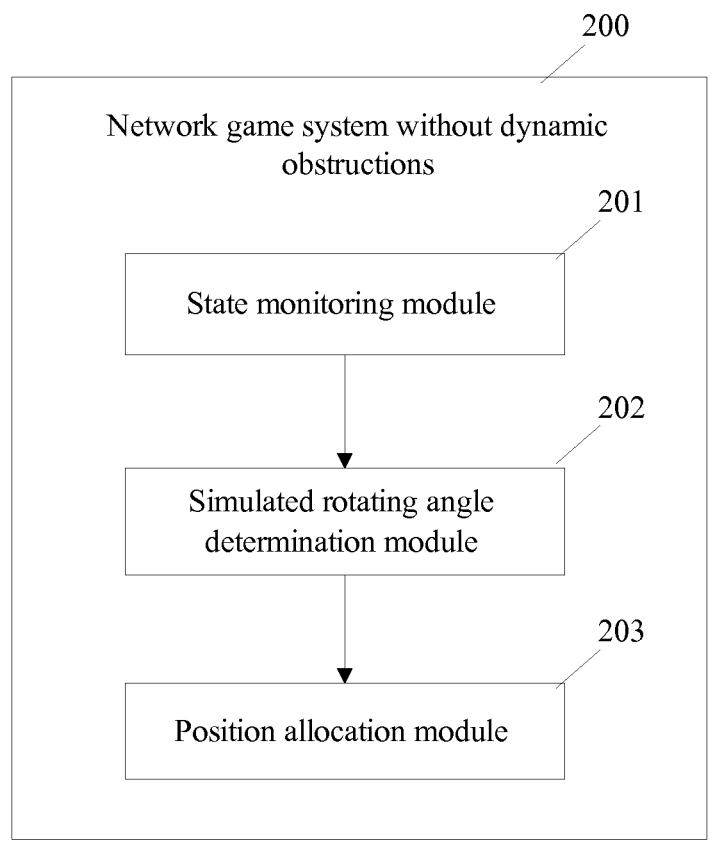
FIG. 2 depicts a structure diagram of an exemplary network game system without dynamic obstructions in accordance with various disclosed embodiments.

FIG. 2 depicts a structure diagram of an exemplary network game system without dynamic obstructions in accordance with various disclosed embodiments. As shown in FIG. 2, a network game system without dynamic obstructions 200 can include a state monitoring module 201, a simulated rotating angle determination module 202, and/or a position allocation module 203. Other components may also be included.

The state monitoring module 201 is configured to monitor a short-range interaction state of an NPC role on a map of a game scene. After the NPC role selects a user role as a target of a short-range interaction, the simulated rotating angle determination module 202 and the position allocation module 203 can be triggered.

The simulated rotating angle determination module 202 is configured to determine a simulated rotation angle C=N×a, wherein N is a total number of all the roles that have the short-range interaction with the user role before the NPC role selects the user role as the target of the short-range interaction. The "a" is a specified reference angle.

The position allocation module 203 is configured to perform a position allocation operation. More specifically, using a current coordinate point of the user role as a center of a circle, a destination coordinate point of the NPC role is calculated after rotating from a current coordinate point of the NPC role in a specified direction by the rotation angle C. After the rotation, it can be determined whether there is any static obstruction at the destination coordinate point on the map.

If there is any static obstruction, a new rotation angle C can be calculated by adding a specified angle to the current rotation angle C, and the position allocation operation is repeated. If there is no static obstruction, the NPC role can be commanded to move to the destination coordinate point and perform the short-range interaction with the target user role (i.e. the user role selected as the target of the short-range interaction).

The processing method in accordance with various disclosed embodiments can mainly deal with the NPC role(s) in the network game system, so the modules as depicted in this disclosure can usually be set within the NPC system in the network game system as a part of the AI module of the NPC system. For other processing modules of the network game system without dynamic obstructions according to various disclosed embodiments, corresponding modules of existing network game systems without dynamic obstructions can be used.

According to various disclosed embodiments, the reference angle "a" can be in a form of $\pi/m$, wherein m can be a positive integer. The added specified angle can also be in the form of $\pi/m$, and the added specified angle may be the same as the reference angle or may be different from the reference angle. In one embodiment, for example, the reference angle "a" and the added specified angle can be about $\pi/4$.

Figure 3:
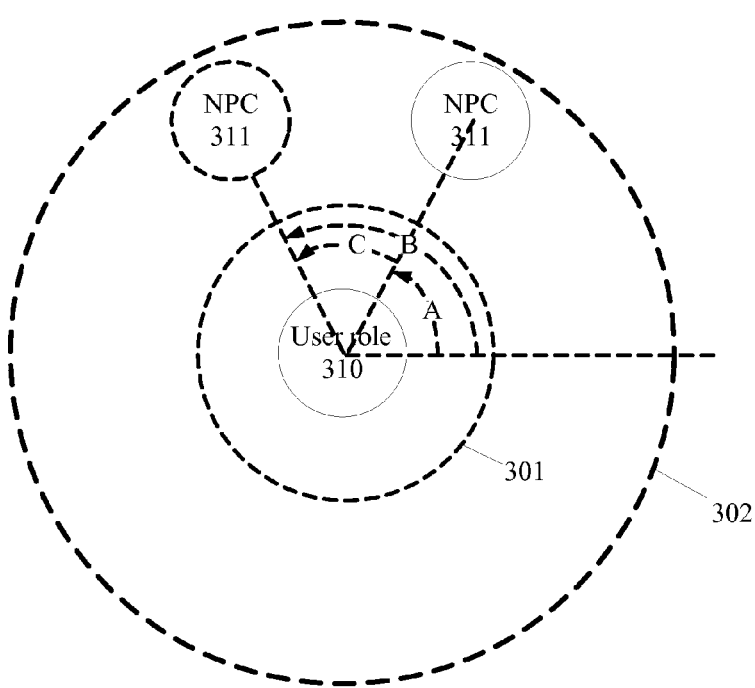
FIG. 3 depicts a schematic of position allocation for an NPC role during a short-range interaction between the NPC role and a user role in accordance with various disclosed embodiments.

FIG. 3 depicts a schematic of position allocation for an NPC role during a short-range interaction between the NPC role and a user role in accordance with various disclosed embodiments. Referring to FIG. 3, a dashed circle 301 and a dashed circle 302 are arranged concentrically using a coordinate point of the user role as the center. The radius of the dashed circle 301 is the sum of a radius r1 of a user role model and a radius r2 of an NPC role model.

The radius of the dashed circle 302 is a predetermined interaction range, and the radius difference between the dashed circle 302 and the dashed circle 301 is an effective interaction range for the short-range interaction between the NPC role and the user role. For example, for an attacking interaction, the radius difference between the dashed circle 302 and the dashed circle 301 is an effective attacking range of the NPC role. The short-range interaction state of the NPC role (e.g., as described in Step 101) can be monitored.

When the NPC role selects the user role 310 as a target of the short-range interaction, e.g., when the NPC role 311 selects the user role 310 as the target of the short-range interaction as shown in FIG. 3, Step 102 can be performed.

In Step 102, if the NPC role 311 is the first NPC role that has a short-range interaction with the user role 310, e.g., if the NPC role 311 is the first NPC role that attacks the user role 310, then the total number N is zero, i.e., N=0. Therefore, the rotation angle C=N×a=0.

Thus, in Step 103, the NPC role 311 that is the first to attack the user role 310 does not perform a simulated rotation. Instead, the current coordinate point of the NPC role 311 can directly serve as the destination coordinate point of the NPC role 311. Next, whether there is a static obstruction at the destination coordinate point on the map can be determined. The static obstruction can be a fixed landscape on the map of the game system that can obstruct role models. For example, if there is a static obstruction item (such as a mountain, a stone, a house, etc.) at the destination coordinate point, there is a static obstruction at the destination coordinate point. If there is no static obstruction item at the destination coordinate point, there is no static obstruction at the destination coordinate point.

If there is no static obstruction at the destination coordinate point, the NPC role 311 can be commanded to move (i.e., can be moved) to the destination coordinate point for the short-range interaction with the target user role 310 (i.e., the user role 310 selected as the target of the short-range interaction). Because the NPC role 311 is the first NPC role that attacks the user role 310, the current coordinate point of the NPC role 311 can already serve as the destination coordinate point of the NPC role 311. Therefore, there is no need for the NPC role 311 to move. Thus, the NPC role 311 can attack the user role 310 at the current coordinate point.

If there is a static obstruction at the destination coordinate point, the specified angle can be added to the current rotation angle C (i.e., C=0 currently) to calculate a new rotation angle C. For example, the specified angle can be about $\pi/4$. Thus, the new rotation angle C=$\pi/4$, and Step 103 can then be repeated.

In Step 103, the using of the current coordinate point of the user role as a center of a circle, and the calculating of the destination coordinate point of the NPC role after the simulated rotation from the current coordinate point in the specified direction by the rotation angle C can include Steps 131-133 as following.

Figure 1B:
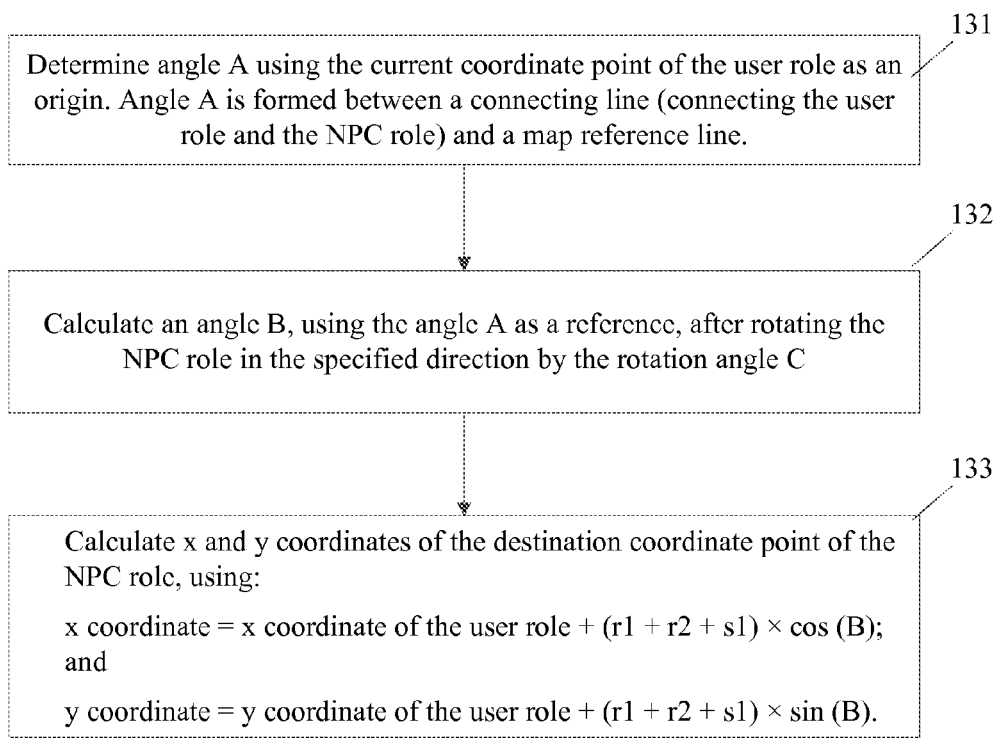
FIG. 1B depicts calculation of a destination coordinate point in an exemplary processing method of a network game system without dynamic obstructions in accordance with various disclosed embodiments.

Referring to FIG. 1B and FIG. 3, in Step 131, using the current coordinate point of the user role 310 as an origin, an angle A is determined (in radians). The angle A can be an angle formed between a connecting line (connecting the user role 310 and the NPC role 311) and a map reference line (usually a horizontal line).

In Step 132, using the angle A as a reference, the NPC role 311 undergoes a simulated rotation in the specified direction (e.g., the specified direction can be a counter-clockwise direction, or a clockwise direction) by the rotation angle C, to calculate an angle B (in radians).

In Step 133, x and y coordinates of the destination coordinate point of the NPC role 311 are calculated, wherein:

$x$ coordinate=$x$ coordinate of the user role+(the NPC role model radius $r1$+the user role model radius $r2$+effective distance of the short-range interaction of the NPC role $s1$)×cos ($B$); and $y$ coordinate=$y$ coordinate of the user role+(the NPC role model radius $r1$+the user role model radius $r2$+effective distance of the short-range interaction of the NPC role $s1$)×sin ($B$).

The effective distance $s1$ of the short-range interaction of the NPC role can be a value selected from an effective distance range of the short-range interaction of the NPC role. In one embodiment, for an attacking interaction, the effective distance $s1$ can be optimally selected. For example, if a maximum effective attacking distance of a certain NPC role is less than about 200 cm, s1 can be a value randomly selected from a range of about 70%~90% of the maximum effective attacking distance. If the maximum effective attacking distance of the certain NPC role is greater than about 200 cm, s1 can be a value randomly selected from a range of about 35%~45% of the maximum effective attacking distance.

After the x and y coordinates of the destination coordinate point are calculated, the NPC role 311 can be commanded to move to the destination coordinate point. During the process of moving of the NPC role 311, the user role 310 may have also moved. Therefore, the moving of the NPC role 311 to the destination coordinate point can further include determining whether a distance between the destination coordinate point (i.e., of the NPC role 311) and a current coordinate point of the user role 310 is greater than the maximum effective distance of the short-range interaction of the NPC role 311 (e.g., the maximum effective attacking distance of the NPC role 311).

If the distance between the destination coordinate point of the NPC role 311 and the current coordinate point of the user role 310 is not greater than the maximum effective distance of the short-range interaction of the NPC role 311, the NPC role 311 can continue moving toward the destination coordinate point. If the distance between the destination coordinate point of the NPC role 311 and the current coordinate point of the user role 310 is greater than the maximum effective distance of the short-range interaction of the NPC role 311, the effective distance s1 of the short-range interaction of the NPC role 311 can be decreased.

For example, if the maximum effective distance of the short-range interaction of the NPC role 311 is less than about 200 cm, s1 can be a value randomly selected from a range of about 1%~8% of the maximum effective attacking distance. If the maximum effective distance of the short-range interaction of the NPC role 311 is greater than about 200 cm, s1 can be a value randomly selected from a range of about 20%~35% of the maximum effective attacking distance. After s1 is decreased, x and y coordinates of the destination coordinate point can be re-calculated to obtain a new destination coordinate point, and the NPC role 311 is commanded to move toward the new destination coordinate point.

In one embodiment, in Step 103, when there is a static obstruction at the destination coordinate point, it can further be determined whether the current rotation angle C is about $2\pi$ (i.e. whether the current simulated rotation is about a full circle). If the current rotation angle C is about $2\pi$, the relationship of the short-range interaction with the user role 310 of the NPC role 311 can be cancelled (e.g., the relationship of the attacking interaction with the user role 310 of the NPC role 311 can be cancelled). If the current rotation angle C is not about $2\pi$, the specified angle can be added to the rotation angle C to reach a new rotation angle C to repeat Step 103.

In one example, the NPC role 311 successfully moves to the destination coordinate point and performs the short-range interaction with the user role 310 (e.g., the NPC role 311 starts to attack the user role 310). If a new NPC role selects the user role 310 as a target of the short-range interaction (e.g., selects the user role 310 as a target of attacking), Steps 102-103 as depicted in various disclosed embodiments can be performed on the new NPC role. However, for the new NPC role, the total number N (i.e., N of all the roles that had the short-range interaction with the user role before the new NPC role selects the user role as the target of the short-range interaction) can no longer be 0, and correspondingly, an initial rotation angle C can no longer be 0.

Figure 4:
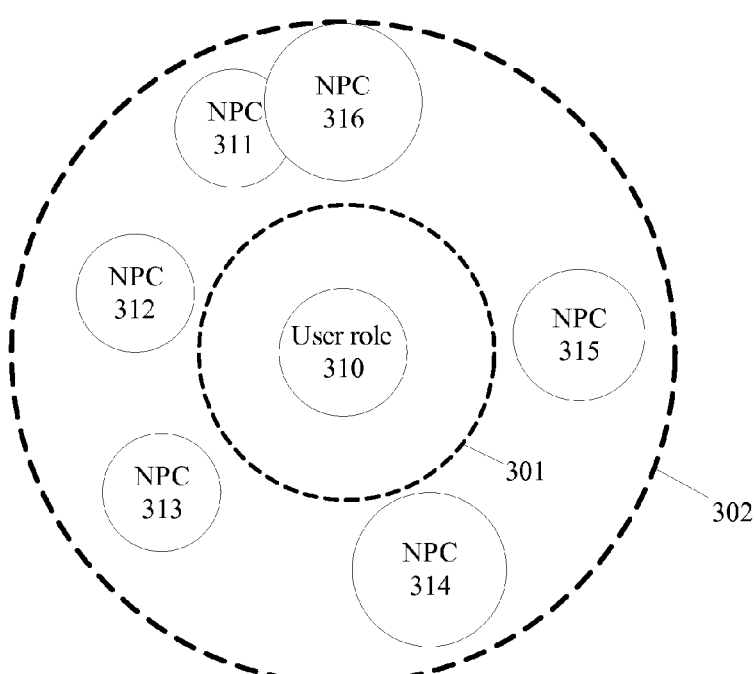
FIG. 4 depicts a schematic of position allocation for all NPC roles having short-range interactions with a user role in an exemplary processing method in accordance with various disclosed embodiments.

FIG. 4 depicts a schematic of position allocation for all NPC roles having short-range interactions with a user role in an exemplary processing method in accordance with various disclosed embodiments. Referring to FIG. 4, for each of all the NPC roles having a user role 310 as a target of a short-range interaction, e.g., NPC roles 311-316 in FIG. 4, Steps 102-103 can be performed. Thus, eventually, all the NPC roles having the user role 310 as the target of the short-range interaction can be located within the effective interaction range for the short-range interactions between the NPC roles and the user role 310 (e.g., attacking the user role 310), i.e., between the dashed circle 302 and the dashed circle 301. So NPC role models and the user role model do not overlap with each other. In addition, the NPC role models can be substantially evenly distributed around the user role 310, so the probability of overlapping between the NPC role models can also be significantly low.

Therefore, as disclosed herein, desired PVE visual experience can thus be provided for users. If an NPC role model is relatively large (such as NPC role 316 in FIG. 4), there may be partial overlapping between the NPC role models, but overall PVE visual experience can be unaffected. Generally, NPC role models and user role models refer to 2D or 3D images corresponding to NPC roles and user roles in network games, respectively. Usually the role models are 2D images in 2D network games, and 3D images in 3D network games. According to various disclosed embodiments, the present disclosure can be applied to both 2D network games and 3D network games.

Accordingly, the processing methods according to various disclosed embodiments can be simple, and do not need real-time and complex dynamic interactive calculation between NPC roles as in existing technologies. Thus, network game system overhead can be reduced.

Certain connecting line between the coordinate points of the user role and the NPC role may have a large angle A relative to the map reference line. For example, the angle A can be near about $2\pi$. If the NPC role further rotates by a rotation angle C in counter-clockwise direction, the connecting line may have an angle greater than about $2\pi$ relative to the map reference line. Therefore, in one embodiment, if the reference angle a and the added specified angle are both $\pi/m$, Step 102 can further include:

After the determining of the total number N, and before the determining of the rotation angle C using $C=N\times a$, calculating N mod M, wherein $M=2\pi/a$, and assigning the modulo to N; and determining the C using $C=N\times a$.

In the present disclosure, the NPC role can be driven by the NPC system in the network game system. In one embodiment, in order to further reduce network game system overhead, especially to reduce NPC system overhead, the method as disclosed can further include:

Monitoring a current load condition of the network game system server, and dynamically adjusting a clock tick interval of the NPC system for the NPC role according to the monitored current load condition. The greater the current load of the network game system server, the longer the correspondingly adjusted clock tick interval of the NPC role.

In one specific embodiment, a tick unit can be a time interval of about 200 ms. The clock tick interval for the NPC role can be an integer multiple of the tick unit, and can be adjusted according to the current load condition.

For example, Table 1 depicts advantages and disadvantages of various lengths of clock tick interval as follows.

TABLE 1

| Clock tick Interval | Disadvantages | Advantages |
|---|---|---|
| Clock tick interval is long | Low corresponding NPC display precision, e.g., NPC role model movement, NPC thinking time duration and state mode transition becoming "slow", etc.; poor PVE experience for users | Low system CPU overhead |
| Clock tick interval is short | High system CPU overhead | High corresponding NPC display precision, e.g., NPC role model movement, NPC thinking time duration and state mode transition becoming "quick", etc.; desired PVE experience for users |

In Table 1, NPC state mode transition can be determined based on the technical scheme of the network game. For example, in a network game system, the NPC state modes can include, e.g., "patrol mode", "attack mode", "chase mode", "return mode", "straight patrol mode", etc. The NPC role can convert mode based on AI logic, and can thus show vivid role model images and states in games.

According to various embodiments disclosed above, by dynamically adjusting the clock tick interval according to the monitored current load condition of the network game system server, flexibility of the NPC system can be improved. The NPC system can thus dynamically balance between effects of both CPU overhead and PVE experience, indirectly stabilize the NPC system, and ensure the stability of operation of the entire network game system.

In order to further reduce network game system overhead, in one embodiment, the method can further include:

Field-of-view searching role objects within a field-of-view range of the NPC role, and maintaining the number of role objects in a field-of-view list according to search results; and Dynamically adjusting a moving distance and field-of-view search range of the NPC role for triggering a field-of-view search, according to the number of the role objects in the field-of-view list. The more the role objects in the field-of-view list of the NPC, the smaller the correspondingly adjusted moving distance and field-of-view search range of the NPC for triggering the field-of-view search.

The field-of-view searching and dynamically adjusting steps as depicted above may be performed during or between any suitable steps of the processing method according to the scheme of the game, which is not limited by this disclosure. The search results from the field-of-view searching may be used for any suitable steps, which is not limited by this disclosure. In one embodiment, the search results can be used for the monitoring of the short-range interaction state of the (NPC) role, and/or for the determining of the total number N.

For example, Table 2 depicts advantages and disadvantages of various moving distances of the NPC role for triggering the field-of-view search.

TABLE 2

| Moving distance | Disadvantages | Advantages |
|---|---|---|
| Moving distance is short | Roles and objects in the field of view of the NPC role can have a "delay"; poor PVE experience for users | Low system CPU overhead |
| Moving distance is long | High system CPU overhead | Roles and objects in the field of view of the NPC role can appear more lifelike; desired PVE experience for users |

Figure 5A:
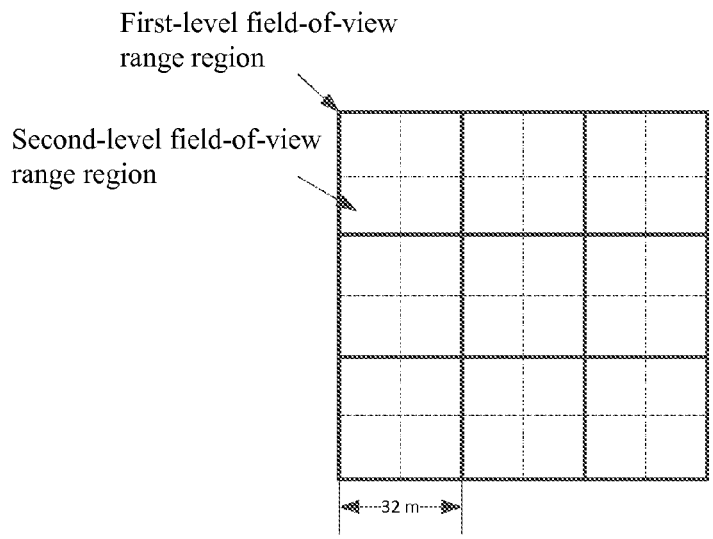
FIG. 5A depicts a schematic of classifying and dividing field-of-view range regions in accordance with various disclosed embodiments.
Figure 5B:
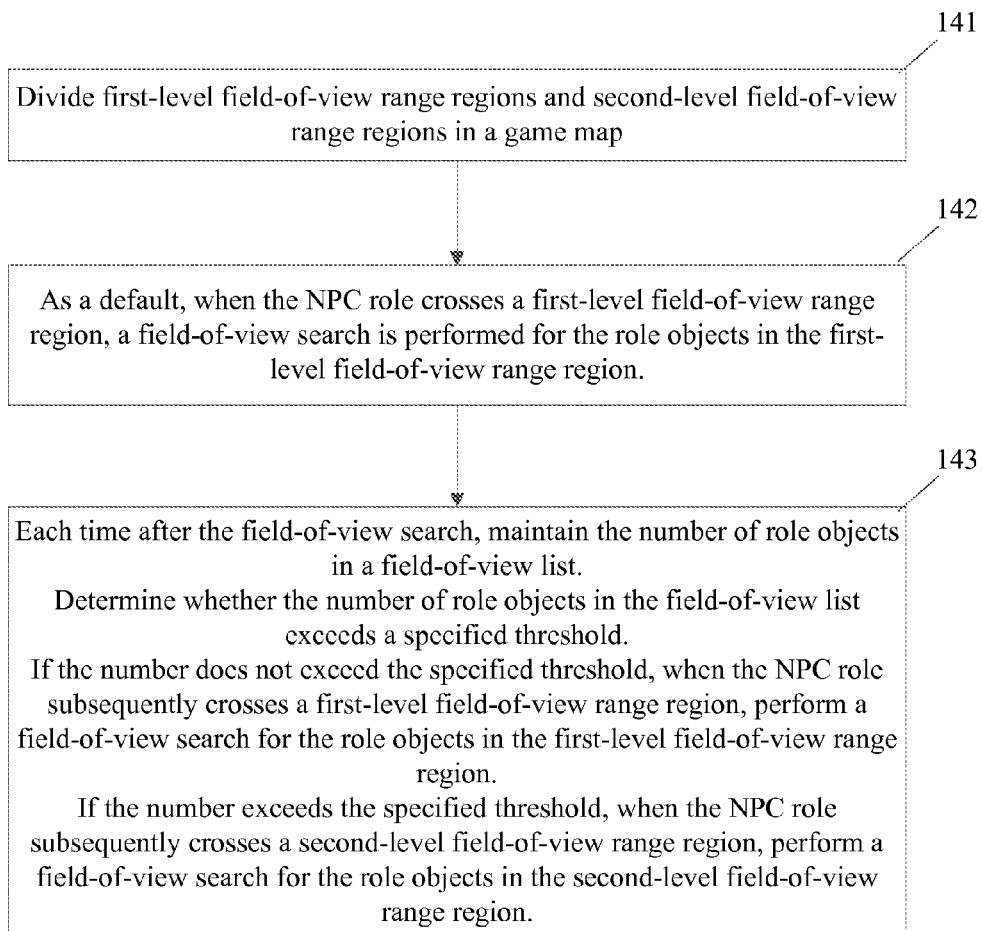
FIG. 5B depicts field-of-view search and adjustment thereof in an exemplary processing method of a network game system without dynamic obstructions in accordance with various disclosed embodiments.

Referring to FIG. 5B, to accomplish the adjustment of the moving distance and field-of-view search range for triggering the field-of-view search, in one embodiment, specifically, following Steps 141-143 can be included.

In Step 141, as shown in FIG. 5A, first-level field-of-view range regions (e.g., the large 3×3 region blocks in FIG. 5A, wherein the size of each region block can be about 32 meters× 32 meters, for example) and second-level field-of-view range regions (e.g., the 2×2 or n×n grid region blocks further divided in each of the large 3×3 region blocks as shown in FIG. 5A) are divided on a game map. The size of a first-level field-of-view range region can be an integer multiple of the size of a second-level field-of-view range region.

In Step 142, as a default, when the NPC role crosses a first-level field-of-view range region, a field-of-view search is performed for the role objects (e.g., other NPC roles and user roles) in the first-level field-of-view range region.

In Step 143, each time after the field-of-view search of the NPC role, according to search results, the number of role objects is maintained in a field-of-view list. And it can be determined whether the number of role objects in the field-of-view list exceeds a specified threshold. If the number of role objects in the field-of-view list does not exceed the specified threshold, when the NPC role subsequently crosses a first-level field-of-view range region, a field-of-view search can be performed for the role objects in the first-level field-of-view range region. If the number of role objects in the field-of-view list exceeds the specified threshold, when the NPC role subsequently crosses a second-level field-of-view range region, a field-of-view search can be performed for the role objects in the second-level field-of-view range region.

Figure 5C:
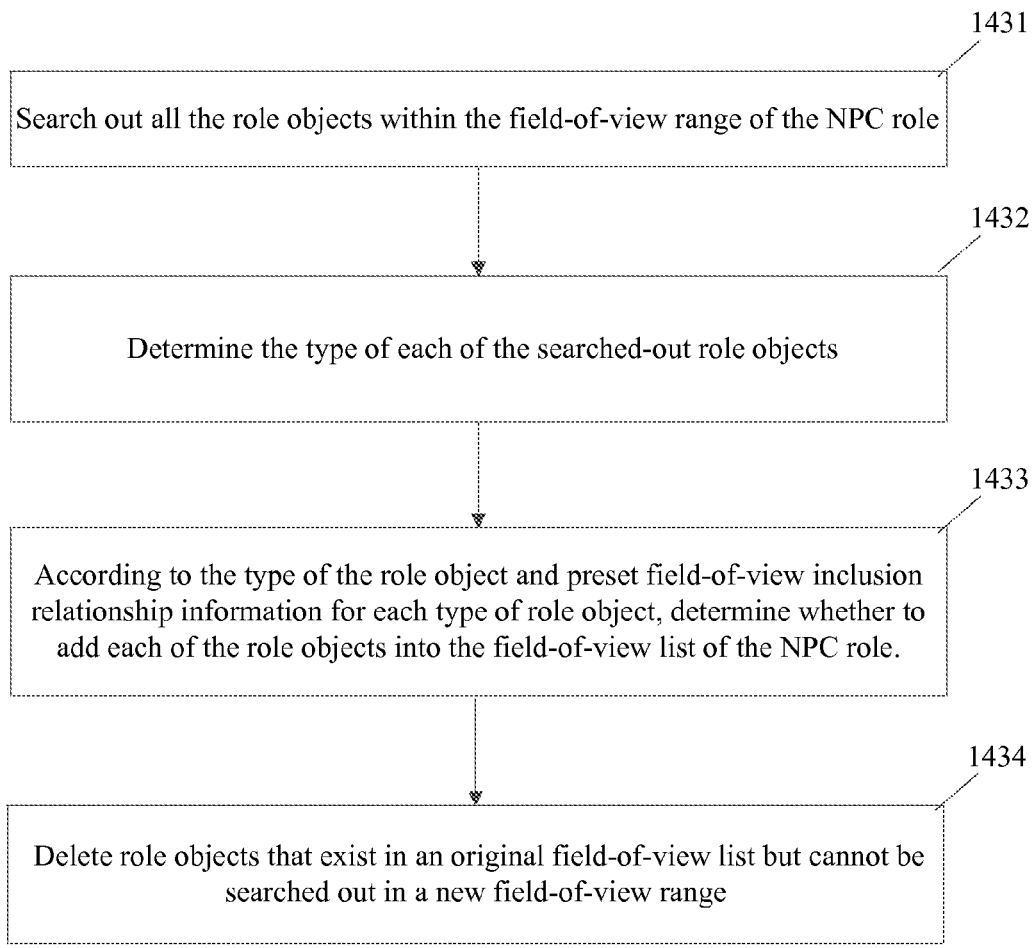
FIG. 5C depicts field-of-view search and maintaining object number in a field-of-view list, in an exemplary processing method of a network game system without dynamic obstructions in accordance with various disclosed embodiments.

Referring to FIG. 5C, the field-of-view searching of the role objects within the field-of-view range of the NPC role, and the maintaining of the number of role objects in the field-of-view list according to result of the searching can include Steps 1431-1434 as follows.

In Step 1431, all the role objects within the field-of-view range of the NPC role are searched out.

In Step 1432, the type of each of the searched-out role objects is determined.

In Step 1433, according to the type of the role object and preset field-of-view inclusion relationship information for each type of role object, it is determined whether to add each of the role objects into the field-of-view list of the NPC role.

In Step 1434, role objects that exist in an original field-of-view list but cannot be searched out in a new field-of-view range are deleted.

Table 3 depicts exemplary and specific preset field-of-view inclusion relationship information for each type of role object.

TABLE 3

| Role | User role | First-level NPC role | Second-level NPC role | Third-level NPC role |
| --- | --- | --- | --- | --- |
| User role | Two-way inclusion into field-of-view | Two-way inclusion into field-of-view | Two-way inclusion into field-of-view | Two-way inclusion into field-of-view, or user role one-way inclusion into field-of-view |
| First-level NPC role | Two-way inclusion into field-of-view | Two-way inclusion into field-of-view | X | X |
| Second-level NPC role | Two-way inclusion into field-of-view | X | X | X |
| Third-level NPC role | Two-way inclusion into field-of-view, or user role one-way inclusion into field-of-view | X | X | X |

As shown in Table 3, in one specific embodiment, NPC roles can be classified into different levels. The field-of-view inclusion relationship information for NPC roles of different levels can be different, such as 1)~4) as follows.

1) User role and user role have symmetrical relationship, and can be included in each other's field of view. User role and first-level NPC role have symmetrical relationship, and can be included in each other's field of view. User role and second-level NPC role have symmetrical relationship, and can be included in each other's field of view. User role and third-level NPC role have symmetrical relationship, and can be included in each other's field of view. However, when the field-of-view list of third-level NPC roles is full, only third-level NPC can be included in the field of view of the user role.

2) First-level NPC role and user role have symmetrical relationship, and can be included in each other's field of view. First-level NPC role and first-level NPC role have symmetrical relationship, and can be included in each other's field of view. First-level NPC role and second-level NPC role or third-level NPC role can have no visibility between each other, and cannot be included in each other's field of view.

3) Second-level NPC role and user role have symmetrical relationship, and can be included in each other's field of view. Second-level NPC role and first-level NPC role or second-level NPC role or third-level NPC role can have no visibility between each other, so cannot be included in each other's field of view.

4) Third-level NPC role and user role have symmetrical relationship, and can be included in each other's field of view. However, when the field-of-view list of third-level NPC roles is full, only third-level NPC can be included in the field of view of the user role. Third-level NPC role and first-level NPC role or second-level NPC role or third-level NPC role can have no visibility between each other, so cannot be included in each other's field of view.

As disclosed in various embodiments above, presetting field-of-view inclusion relationship for each type of role object can have advantages (1)~(3) as follows, for example.

(1) The probability of the field-of-view list reaching the threshold can be reduced, wherein the threshold is the specified threshold for triggering a field-of-view search that crosses a second-level field-of-view range region. Thus, the frequency of field-of-view search during moving can be decreased. The consumption of field-of-view search algorithm can be reduced, so the CPU consumption can be reduced.

(2) When the field-of-view list of third-level NPC roles is full, only third-level NPC role can be included the field of view of the user role, in order to prevent the situation where the user role cannot see the third-level NPC role and thus cannot receive tasks.

(3) When there are no other roles in the field-of-view list of the NPC role, the AI logic behaviors can be stopped, thus reducing the consumption of CPU.

Figure 6:
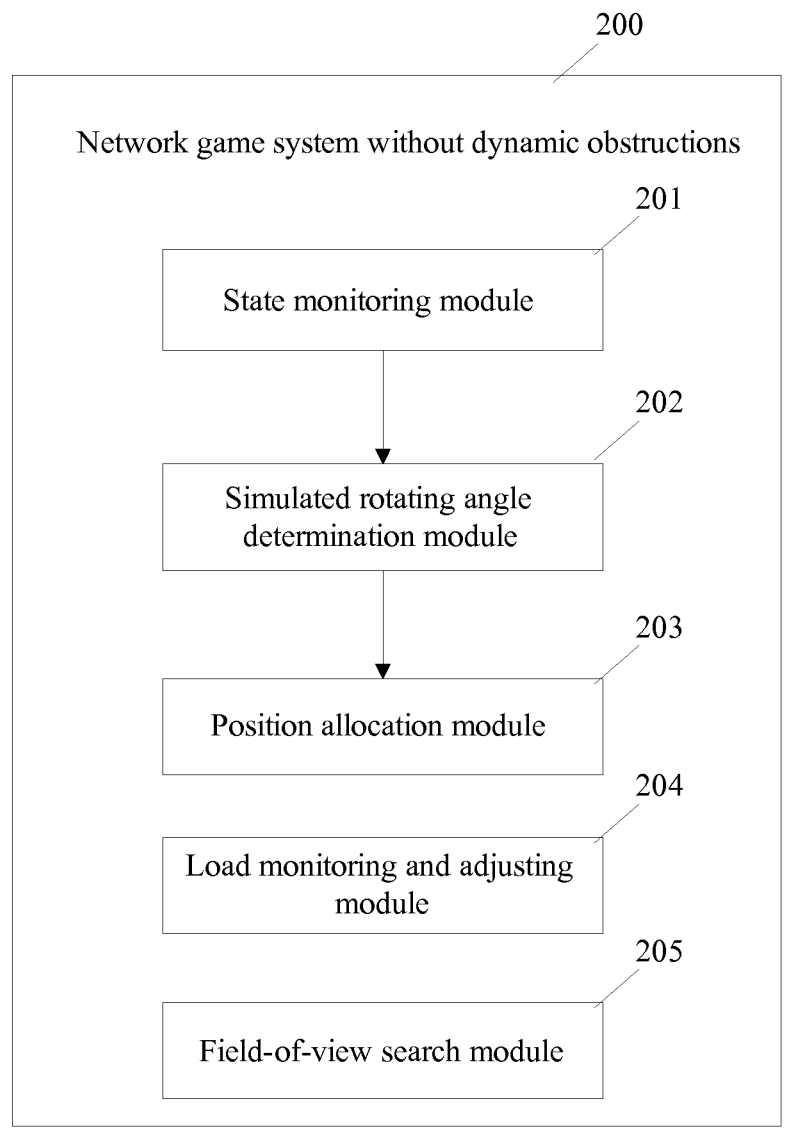
FIG. 6 depicts a structure diagram of another exemplary network game system without dynamic obstructions in accordance with various disclosed embodiments.

Corresponding to the methods as disclosed, as shown in FIG. 6, the network game system according to various disclosed embodiments can include the state monitoring module 201, the simulated rotation angle determination module 202, and the position allocation module 203 (also referring to FIG. 2), and can further include a load monitoring and adjusting module 204.

The load monitoring and adjusting module 204 is configured to monitor the current load condition of the network game system server, and to dynamically adjust the clock tick interval of the NPC system for the NPC role according to the monitored load condition, wherein the greater the current load of the network game system server, the longer the correspondingly adjusted clock tick interval of the NPC role.

The network game system can further include a field-of-view search module 205. The field-of-view search module 205 is configured to perform a field-of-view search for role objects within a field-of-view range of the NPC role and to maintain the number of role objects in a field-of-view list according to search results. In addition, the field-of-view search module 205 is also configured to dynamically adjust a moving distance and field-of-view search range of the NPC role for triggering the field-of-view search, according to the number of role objects in the field-of-view list. The larger the number of the role objects in the field-of-view list of the NPC role, the smaller the correspondingly adjusted moving distance and field-of-view search range of the NPC for triggering the field-of-view search.

In addition, in order to further reduce network game system overhead, in one embodiment, in the methods disclosed herein can further include:

during the calculating, by the network game system, of a distance S between any two coordinate points on the map, using a line connecting the two coordinate points as a hypotenuse of a right triangle, and drawing the right triangle using the two coordinate points as vertices of the right triangle;

determining the length of two legs of the right triangle, wherein A is the length of the long leg and B is the length of the short leg; and using S=A+B/2 to calculate the distance between the two points.

Usually, $S=\sqrt{A^2+B^2}$ is used to calculate the distance between the two coordinate points. However, the square calculation and root calculation can both consume CPU overhead. Thus, using the formula S=A+B/2 to calculate the distance can make improvements on CPU load.

By using the calculation method that applies the formula S=A+B/2 as disclosed herein, the calculated distance between the two coordinate points may have a certain error, but the maximum error can be less than about 12% and the average error can be about 5%. Such a range of error can be acceptable in network game systems, and do not have a large impact on picture and game operation experience. The advantage can be lower CPU overhead consumed by addition and division operations, so that system resources can be saved.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and systems can be used in a variety of game applications. By using the disclosed methods and systems, a short-range interaction state of a non-player-controlled character (NPC) role is monitored on a map of a game having a user role corresponding to a user playing the game. When the NPC role selects a user role as a target of a short-range interaction, a number N is determined, where N is a total number of all NPC roles that have the short-range interaction with the user role before the NPC role selects the user role as the target. A rotation angle C is determined using C=N×a, wherein "a" is a specified reference angle. Next, a position allocation operation is performed. The position allocation operation includes calculating a destination coordinate point of the NPC role after a simulated rotation from a current coordinate point of the NPC role in a specified direction by the rotation angle C, using a current coordinate point of the user role as a center of a circle. The position allocation operation also includes determining whether there is a static obstruction at the destination coordinate point on the map. When there is a static obstruction, a new rotation angle C is calculated by adding a specified angle to the current rotation angle C to repeat the position allocation operation. When there is not a static obstruction, the NPC role is moved to the destination coordinate point to perform the short-range interaction with the user role.

By using the disclosed methods and systems, all the NPC roles having the user role as the target of the short-range interaction can be located within a distance range, in which the distance range is the effective interaction range for the short-range interactions between the NPC roles and the user role. So NPC role models and the user role model do not overlap with each other. In addition, the NPC role models can be substantially evenly distributed around the user role, so the probability of overlapping between the NPC role models can also be significantly low. Thus, desired PVE (or player VS Environment) visual experience can be provided for users. In addition, the disclosed methods and systems are simple, and do not need real-time and complex dynamic interactive calculation between NPC roles. Thus, game system overhead can be reduced.

The invention claimed is:

1. A processing method for a network game system without dynamic obstructions, the network game system including at least a game server and a user terminal, the game server having at least one processor, the user terminal having at least one processor, comprising:

providing, by the network game system, an non-player-controlled character (NPC) system to control a plurality of NPC roles in a network game;

monitoring, by at least one of the game server and the user terminal, a short-range interaction state of a non-player-controlled character (NPC) role on a map of the network game having a user role corresponding to a user playing the game with the user terminal;

when the NPC role selects a user role as a target of a short-range interaction, determining, by at least one of the game server and the user terminal, a total number N of all NPC roles that have the short-range interaction with the user role before the NPC role selects the user role as the target;

determining, by at least one of the game server and the user terminal, a rotation angle C=N×a, wherein "a" is a specified reference angle;

performing, by at least one of the game server and the user terminal, a position allocation operation, the position allocation operation comprising:

using a current coordinate point of the user role as a center of a circle, calculating a destination coordinate point of the NPC role after a simulated rotation from a current coordinate point of the NPC role in a specified direction by the rotation angle C;

determining whether there is a static obstruction at the destination coordinate point on the map;

when there is a static obstruction, calculating a new rotation angle C by adding a specified angle to the current rotation angle C to repeat the position allocation operation; and when there is not a static obstruction, moving the NPC role to the destination coordinate point to perform the short-range interaction with the user role;

monitoring a current load condition of the game server related to the NPC system controlling the NPC roles; and adjusting a clock tick interval of the NPC system according to the monitored current load condition, wherein a length of the clock tick interval corresponds to the current load condition.

2. The method according to claim 1, wherein the calculating of the destination coordinate point of the NPC role further includes:

by using the current coordinate point of the user role as an origin, determining an angle A formed between a connecting line of the user role and the NPC role and a map reference line;

by using the angle A as a reference, calculating an angle B after a simulated rotation of the NPC role in the specified direction by the rotation angle C; and calculating "x" and "y" coordinates of the destination coordinate point of the NPC role, wherein the "x" coordinate =an "x" coordinate of the user role +(r1 +r2 +s1) ×cos (B), and the "y" coordinate =a "y" coordinate of the user role +(r1 +r2 +s1) ×sin (B), and wherein r1 is an NPC role model radius, r2 is a user role model radius, and s1 is an effective distance of the short-range interaction of the NPC role and is a value selected from an effective distance range of the short-range interaction of the NPC role.

3. The method according to claim 2, wherein the moving of the NPC role to the destination coordinate point further includes:

determining whether a distance between the destination coordinate point of the NPC role and the current coordinate point of the user role is greater than a maximum effective distance of the short-range interaction of the NPC role;

when the destination coordinate point and the current coordinate point of the user role is not greater than the maximum effective distance, moving the NPC role toward the destination coordinate point, and when the destination coordinate point and the current coordinate point of the user role is greater than the maximum effective distance, decreasing the s1 and recalculating the x and y coordinates of the destination coordinate point to obtain a new destination coordinate point and to move the NPC role toward the new destination coordinate point.

4. The method according to claim 2, wherein the reference angle "a" and the added specified angle are in a form of $\pi/m$, with "m" being a positive integer, further includes:

after the determining of the total number N, and before the determining of the rotation angle C, calculating a modulo of N mod M, wherein $M=2\pi/a$, to assign the modulo to N; and determining the rotation angle C using $C=N\times a$.

5. The method according to claim 4, further including:

when there is a static obstruction at the destination coordinate point, and before the calculating of the new rotation angle C, determining whether the current rotation angle C is about $2\pi$;

when the current rotation angle C is about $2\pi$, cancelling a relationship of the short-range interaction with the user role of the NPC role; and when the current rotation angle C is not about $2\pi$, calculating a new rotation angle C by adding the specified angle to the current rotation angle C to repeat the position allocation operation.

6. The method according to any one of claims 1-5, further including:

monitoring a current load of a server of the network game system; and dynamically adjusting a clock tick interval for the NPC role according to the monitored load condition, wherein the greater the current load, the longer the correspondingly adjusted clock tick interval.

7. The method according to claim 1, further including:

field-of-view searching role objects within a field-of-view range of the NPC role;

maintaining a number of the role objects in a field-of-view list according to search results; and dynamically adjusting a moving distance and a field-of-view search range of the NPC role for triggering a field-of-view search, according to the number of the role objects in the field-of-view list, wherein the larger the number of the role objects in the field-of-view list, the smaller the correspondingly adjusted moving distance and field-of-view search range.

8. The method according to claim 1, further including:

dividing first-level field-of-view range regions and second-level field-of-view range regions on the map of the game scene, wherein a size of each first-level field-of-view range region is an integer multiple of a size of each second-level field-of-view range region;

field-of-view searching, as a default, for the role objects in a first-level field-of-view range region when the NPC role crosses the first-level field-of-view range region; and maintaining the number of role objects in the field-of-view list according to the search results each time after the field-of-view searching;

determining whether the number of the role objects in the field-of-view list exceeds a specified threshold;

when the number of the role objects in the field-of-view list does not exceed the specified threshold, and when the NPC role subsequently crosses one first-level field-of-view range region, performing the field-of-view search for the role objects in the one first-level field-of-view range region, and when the number of the role objects in the field-of-view list exceeds the specified threshold, and when the NPC role subsequently crosses one second-level field-of-view range region, performing the field-of-view search for the role objects in the one second-level field-of-view range region.

9. The method according to claim 7, wherein the field-of-view searching of the role objects and the maintaining of the number of role objects in the field-of-view list further includes:

searching out all of the role objects within the field-of-view range of the NPC role;

determining a type of each one of the searched-out role objects;

determining whether to include the role objects in the field-of-view list of the NPC role, according to the type of the each one of the searched-out role objects and preset field-of-view inclusion relationship information; and deleting the role objects that exist in an original field-of-view list but cannot be searched out in a new field-of-view range.

10. The method according to claim 8, wherein the field-of-view searching of the role objects and the maintaining of the number of role objects in the field-of-view list further includes:

searching out all of the role objects within the field-of-view range of the NPC role;

determining a type of each one of the searched-out role objects;

determining whether to include the role objects in the field-of-view list of the NPC role, according to the type of the each one of the searched-out role objects and preset field-of-view inclusion relationship information; and deleting the role objects that exist in an original field-of-view list but cannot be searched out in a new field-of-view range.

11. The method according to claim 1, further including:

calculating a distance S between any two coordinate points on the map by:

using a line connecting the two coordinate points as a hypotenuse of a right triangle and drawing the right triangle using the two coordinate points as vertices of the right triangle;

determining a length of each of two legs of the right triangle, wherein A is a length of a long leg, and wherein B is a length of a short leg; and calculating the distance S using $S=A+B/2$.

12. A network game system without dynamic obstructions, the network game system including at least a game server and a user terminal, the game server having at least one processor, the user terminal having at least one processor, comprising:
- a simulated rotating angle determination module;
- a position allocation module;
- a state monitoring module configured to:
  - monitor a short-range interaction state of an NPC role on a map of a game scene, and
  - trigger a simulated rotating angle determination module and a position allocation module after the NPC role selects a user role as a target of a short-range interaction; and
- a load monitoring and adjusting module configured to monitor a current load condition of the game server related to the NPC system controlling the of NPC roles in the network game, and to adjust a clock tick interval of an NPC system according to the current load condition, wherein the NPC system controls a plurality of NPC roles in the network game, wherein:
- the simulated rotating angle determination module is configured to determine a rotation angle C=N×a, wherein N is a total number of all roles that have the short-range interaction with the user role before the NPC role selects the user role as the target, and wherein the "a" is a specified reference angle; and
- the position allocation module is configured to perform a position allocation operation, the position allocation operation including:
  - using a current coordinate point of the user role as a center of a circle, calculating a destination coordinate point of the NPC role after a simulated rotation from a current coordinate point of the NPC role in a specified direction by the rotation angle C; and
  - determining whether there is a static obstruction at the destination coordinate point on the map, wherein when there is a static obstruction, a new rotation angle C is calculated by adding a specified angle to the rotation angle C to repeat the position allocation operation, and when there is not a static obstruction, the NPC role is moved to the destination coordinate point to perform the short-range interaction with the user role.

13. The system according to claim 12, further including:
a load monitoring and adjusting module configured to:
- monitor a current load of a server of the network game system; and
- dynamically adjust a clock tick interval for the NPC role according to the monitored current load, wherein the greater the current load, the longer the correspondingly adjusted clock tick interval.

14. The system according to claim 12, further including:
a field-of-view search module configured to:
- perform a field-of-view search for role objects within a field-of-view range of the NPC role and to maintain a number of the role objects in a field-of-view list according to search results; and
- dynamically adjust a moving distance and a field-of-view search range of the NPC role for triggering the field-of-view search, according to the number of the role objects in the field-of-view list, wherein the larger the number of the role objects in the field-of-view list, the smaller the correspondingly adjusted moving distance and field-of-view search range.

* * * * *